US007431531B2

(12) United States Patent
Carnevali

(10) Patent No.: US 7,431,531 B2
(45) Date of Patent: Oct. 7, 2008

(54) QUICK RELEASE MOUNTING APPARATUS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 11/393,253

(22) Filed: Mar. 30, 2006

(65) Prior Publication Data

US 2007/0231064 A1 Oct. 4, 2007

(51) Int. Cl.
*B25G 3/16* (2006.01)
*F16D 1/092* (2006.01)

(52) U.S. Cl. ...................................... 403/328; 403/362

(58) Field of Classification Search ............ 248/346.01, 248/346.03, 519, 677, 678; 403/109.6, 328, 403/335, 338, 361, 378, 379.3, 383, 407.1, 403/408.1, 409.1, 355, 362, 324, 325, 306; 108/90, 91, 180

See application file for complete search history.

(56) References Cited

U.S. PATENT DOCUMENTS 2,893,298 A * 7/1959 Averette ..................... 404/121
3,391,660 A * 7/1968 Stewart ................. 108/158.11
3,438,606 A * 4/1969 Rubin ........................ 248/415
3,696,761 A * 10/1972 Brown ....................... 108/53.3
3,915,099 A * 10/1975 Wies et al. ................. 108/56.3
4,575,277 A * 3/1986 Dickey ....................... 403/361
5,087,145 A * 2/1992 Cooley ........................ 402/79
5,176,465 A * 1/1993 Holsted ................... 403/379.6
6,006,677 A * 12/1999 Apps et al. ............... 108/57.25
6,015,139 A * 1/2000 Weber ..................... 256/65.14
6,183,167 B1 * 2/2001 Ruiz et al. .................. 405/251

* cited by examiner

*Primary Examiner*—Daniel P. Stodola
*Assistant Examiner*—Joshua T Kennedy
(74) *Attorney, Agent, or Firm*—Charles J. Rupnick

(57) ABSTRACT

A quick release mounting apparatus for quick assembly and subsequent disassembly a base having a mounting plate formed with means for securing it to a first external surface, and a fitting having a mounting plate formed with means for securing it to a second external surface spaced away from the first external surface. A connector is coupled between the base and the fitting, the connector being formed of a male bayonet and a mating female receiver, each of the male bayonet and female receiver having substantially inverse truncated conical bodies structured for nesting along a common longitudinal axis. A rotational alignment mechanism is formed between the male bayonet and female receiver and is operable along the common longitudinal axis. A releasable locking mechanism is operable between the male bayonet and female receiver.

19 Claims, 7 Drawing Sheets

QUICK RELEASE MOUNTING APPARATUS

FIELD OF THE INVENTION

The present invention relates to a releasable mounting apparatus, and in particular to a quick release mounting having a bayonet connector and locking mechanism.

BACKGROUND OF THE INVENTION

Mounting platforms are generally well-known for securely mounting and supporting all manner of equipment. Quick release mounting platforms are known that form a subset of mounting platforms in general. The genre of quick release mounting platforms includes mounting platforms that have a base permanently mounted on a desired surface, a fitting that mounts to the base, and a connector in between for quickly connecting and disconnecting the fitting with the base.

However, known quick release mounting platforms tend to be cumbersome in one more of the connection and retaining technologies, often requiring precisely locating the fitting on the base with twisting and turning motions that are all but impossible to accomplish blind, while the retaining technology often requires threading rings onto collars or manipulating over-center clamps or the like.

Thus, current quick release mounting platforms generally fail to provide truly “quick” release mounting.

SUMMARY OF THE INVENTION

The present invention is a quick release mounting apparatus that overcomes known limitations of prior art apparatus for quick assembly and subsequent disassembly by providing a quick release mounting apparatus providing a base having a mounting plate formed with means for securing it to a first external surface, and a fitting having a mounting plate formed with means for securing it to a second external surface spaced away from the first external surface. A connector is coupled between the base and the fitting, the connector being formed of a male bayonet and a mating female receiver, each of the male bayonet and female receiver having substantially inverse conical bodies structured for nesting along a common longitudinal axis. A rotational alignment mechanism is formed between the male bayonet and female receiver and is operable along the common longitudinal axis. A releasable locking mechanism is operable between the male bayonet and female receiver.

According to one aspect of the invention, the rotational alignment mechanism of the apparatus provides a pair of substantially planar surfaces formed on the respective conical bodies of the male bayonet and female receiver, with the planar surfaces being matingly inclined relative to the common longitudinal axis.

According to another aspect of the invention, the releasable locking mechanism of the apparatus is further operable between the male bayonet and female receiver substantially crosswise to the common longitudinal axis of the apparatus.

According to another aspect of the invention, the releasable locking mechanism is further operable through the substantially planar surfaces of the rotational alignment mechanism of the apparatus.

According to another aspect of the invention, the releasable locking mechanism of the apparatus provides a pin, and each of the male bayonet and female receiver further provides a clearance aperture therein, each of the clearance apertures being mutually aligned relative to the common longitudinal axis and the rotational alignment axis and being sized to slidably receive the pin.

According to another aspect of the invention, the releasable locking mechanism of the apparatus further provides a releasable retaining mechanism between the pin and one of the male bayonet and the female retainer, the releasable retaining mechanism being structured for releasably retaining the pin relative to the one of the clearance apertures.

According to another aspect of the invention, the releasable retaining mechanism of the apparatus further provides a releasable retaining mechanism selected from the group of releasable retaining mechanisms including: a threaded retaining mechanism, a spring retaining mechanism, and a detent retaining mechanism.

Furthermore, according to another aspect of the invention, the male bayonet and female receiver provide cooperating truncated conical shapes having respective exterior and interior side walls each inclined at substantially inverse angles to the common longitudinal axis.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
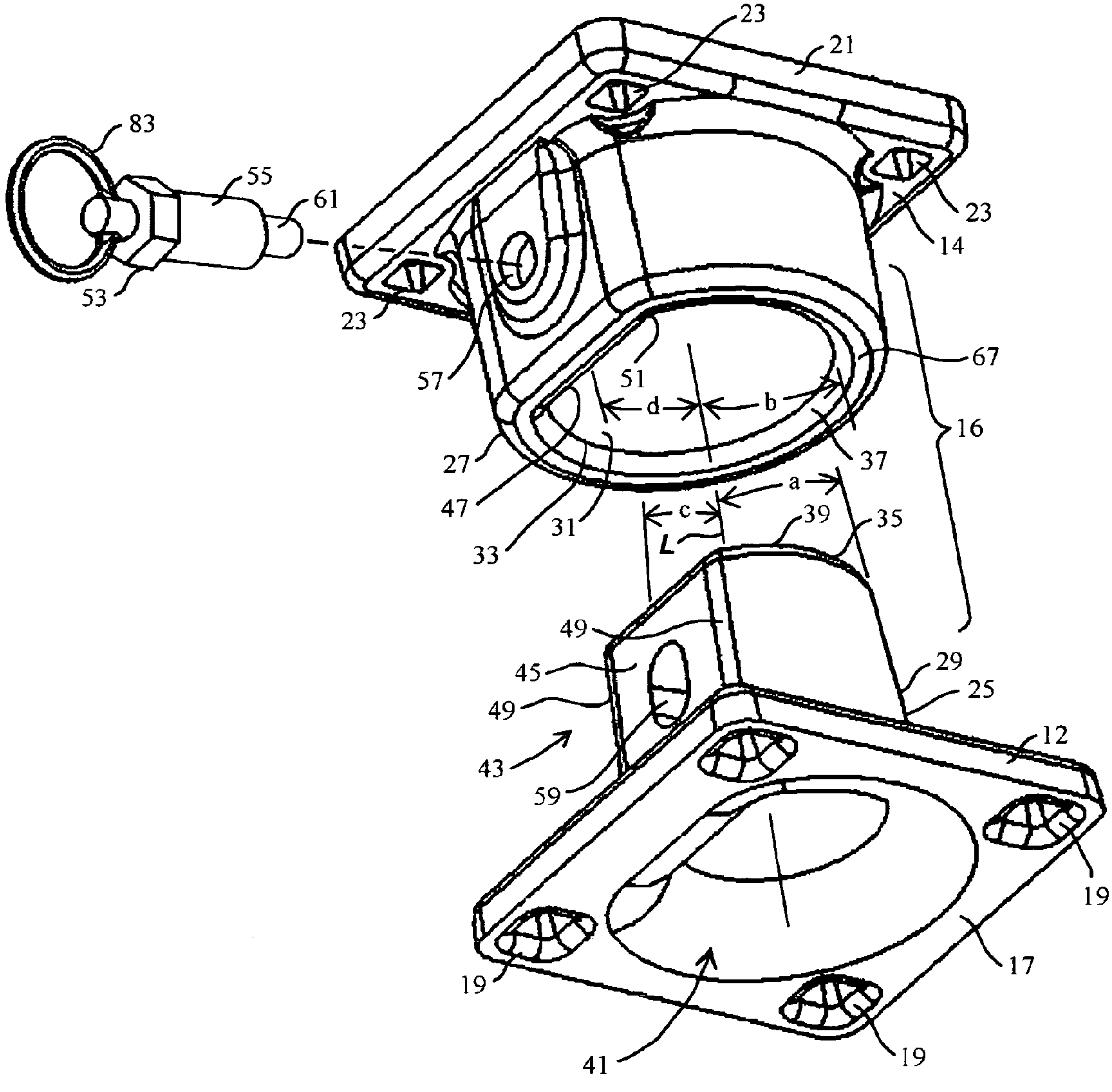
FIG. 1 is a perspective view that illustrates the present invention embodied as a quick release mounting apparatus.

FIG. 1 is a perspective view that illustrates the apparatus of the present invention embodied as a quick release mounting apparatus 10 having a base structure 12 and fitting 14, both substantially rigid, with a substantially rigid connector 16 coupled therebetween. By example and without limitation, the rigid base 12 is formed with a rigid mounting plate 17 having one or more mounting holes 19 therethrough for connecting the plate 17 to an external surface such as a floor board of an automobile or other vehicle. By example and without limitation, the rigid fitting 14 is formed with a rigid mounting plate 21 having one or more mounting holes 23 therethrough for connecting the plate 21 to an external object such as but not limited to a telescoping pole mount of the type disclosed in co-pending patent application Ser. No. 11/118,734 filed in the name of the inventor of the present application on Apr. 29, 2005, and incorporated herein by reference, whereby the external object is removably mounted to the external surface connecting the plate 21 to an external object such as but not limited to a telescoping pole mount of the type disclosed in co-pending patent application Ser. No. 11/118,734 filed in the name of the inventor of the present application on Apr. 29, 2005, and incorporated herein by reference, whereby the external object is removably mounted to the external surface. Alternatively, the respective roles of the base 12 and fitting 14 can be reversed without substantial effect on the device 10, such that the fitting 14 is connected through its mounting plate 21 to the external surface, and the base 12 is connected through its mounting plate 17 to the external object to be removably mounted to the external surface.

The substantially rigid connector 16 between the base 12 and fitting 14 is formed of a substantially rigid male bayonet 25 and a substantially rigid mating female receiver 27. Each of the male bayonet 25 and female receiver 27 have substantially conical forms structured for coupling along a common longitudinal axis L that is substantially perpendicular to the respective base and fitting mounting plates 17, 21. The male bayonet 25 and female receiver 27 are operational along the common longitudinal axis L for accomplishing such coupling and subsequent decoupling.

The male bayonet 25 and female receiver 27 have cooperating truncated conical shapes with respective exterior and interior side walls 29, 31 each slightly inclined to substantially inverse angles a, b. However, the degree of incline or slope of the cooperating truncated conical shapes is great enough that a mouth 33 opening into the female receive 27 is sufficiently large in comparison to a crown end 35 of the male bayonet 25 fits loosely thereinto with room to spare. Furthermore, the mouth 33 of the female receive 27 and the crown end 35 of the male bayonet 25 have respective lead-in features 37, 39, for example respective fillets and rounds or chamfers, which ease assembly and mating in addition to the difference in size between the mouth 33 of the female receive 27 and the crown end 35 of the male bayonet 25.

According to one embodiment of the invention, the male bayonet 25 and female receiver 27 are each further formed with substantially smooth and unbroken mating surfaces along the common longitudinal axis L. Additionally, the male bayonet 25 is optionally formed with a hollow core 41 which optionally generally follows the contour of the bayonet exterior side walls 29.

An optional rotational alignment mechanism 43 formed between the male bayonet 25 and female receiver 27 causes them to engage along their common longitudinal axis L in a consistent rotational alignment so that, after the base 12 (or fitting 14) is secured to an external surface such as a floor board of an automobile or other vehicle in a selected orientation, any external object secured to the plate 21 of the fitting 14 (or plate 17 of base 12) in a selected orientation with the base 12 (or fitting 14) can be easily removed and later reinstalled, whereby the external device is again mounted to the external surface in a substantially identical orientation.

Furthermore, the optional rotational alignment mechanism 43 simultaneously operates as an anti-rotation mechanism between the male bayonet 25 and female receiver 27 such that, when fully engaged, the male bayonet 25 and female receiver 27 cannot rotate relative to one another to any significant degree about their common longitudinal axis L. By example and without limitation the optional rotational alignment and anti-rotation mechanism 43 is provided by cooperating flats 45, 47 formed on the male bayonet 25 and female receiver 27, respectively, along the common longitudinal axis L. The respective surfaces of the cooperating flats 45, 47 may optionally also be cooperatingly inclined relative to the common longitudinal axis L, whereby the inclined flats 45, 47 nest in substantially surface-to-surface contact when the base 12 and fitting 14 are engaged. For example, the flats 45, 47 are inclined at substantially inverse angles c, d to the common longitudinal axis L. Optionally, the inverse angles c, d are substantially the same as respective inverse angles a, b as walls 29, 31 of the respective male bayonet 25 and female receiver 27. Furthermore, the inclined surface flats 45, 47 operate as lead-in features during engagement of the base 12 and fitting 14. Either or both of the cooperating flats 45, 47 may optionally also include additional lead-in features 49, 51, for example respective rounds and fillets or chamfers, which ease assembly along and rotational mating about the common longitudinal axis L of the female receive 27 and the male bayonet 25. Other rotational alignment mechanisms 43 than the cooperating flats 45, 47 are also contemplated and can be substituted without deviating from the scope and intent of the present invention. For example, a slotted keyway and mating key both aligned along the common longitudinal axis L can be substituted for the cooperating flats 45, 47 without deviating from the scope and intent of the present invention. Such equivalent alternative rotational alignment mechanisms 43 are also expected to operate as anti-rotation mechanisms after the fitting 14 and base 12 are engaged.

Optionally, the mounting apparatus 10 of the invention includes a releasable locking mechanism 53 between the base 12 and fitting 14. By example and without limitation, the releasable locking mechanism 53 is provided between the male bayonet 25 and female receiver 27, for example, as a pin 55 and a mating aperture formed between the male bayonet 25 and female receiver 27, wherein the mating aperture includes a clearance hole 57 through the side wall 31 or flat 47 (shown) of the female receiver 27, and a matching clearance hole 59 through the side wall 29 or flat 45 (shown) of the male bayonet 25 that are aligned substantially perpendicular to the common longitudinal axis L when the male bayonet 25 and female receiver 27 are mated. Optionally, the pin 55 may be formed with a lead-in feature or nose 61, such as a reduced diameter nose with a round or chamfer (shown in FIG. 2) to ease insertion into the clearance holes 57, 59. Optionally, one or both of the clearance holes 57, 59 are formed as a slot that is elongated along the common longitudinal axis L. The slotting of one or both of the clearance holes 57, 59 further eases insertion of the pin 55 without substantial effect on the security offered by the mounting apparatus 10 because the assembly of the male bayonet 25 and female receiver 27 remains sufficiently secure without the locking mechanism 53 by simply maintaining the common longitudinal axis L of the device 10 substantially upright. The optional locking mechanism 53 is thus present primarily for maintaining the connection in a catastrophe, such as a gross upset or overturning of the vehicle in which it is mounted.

Figure 2:
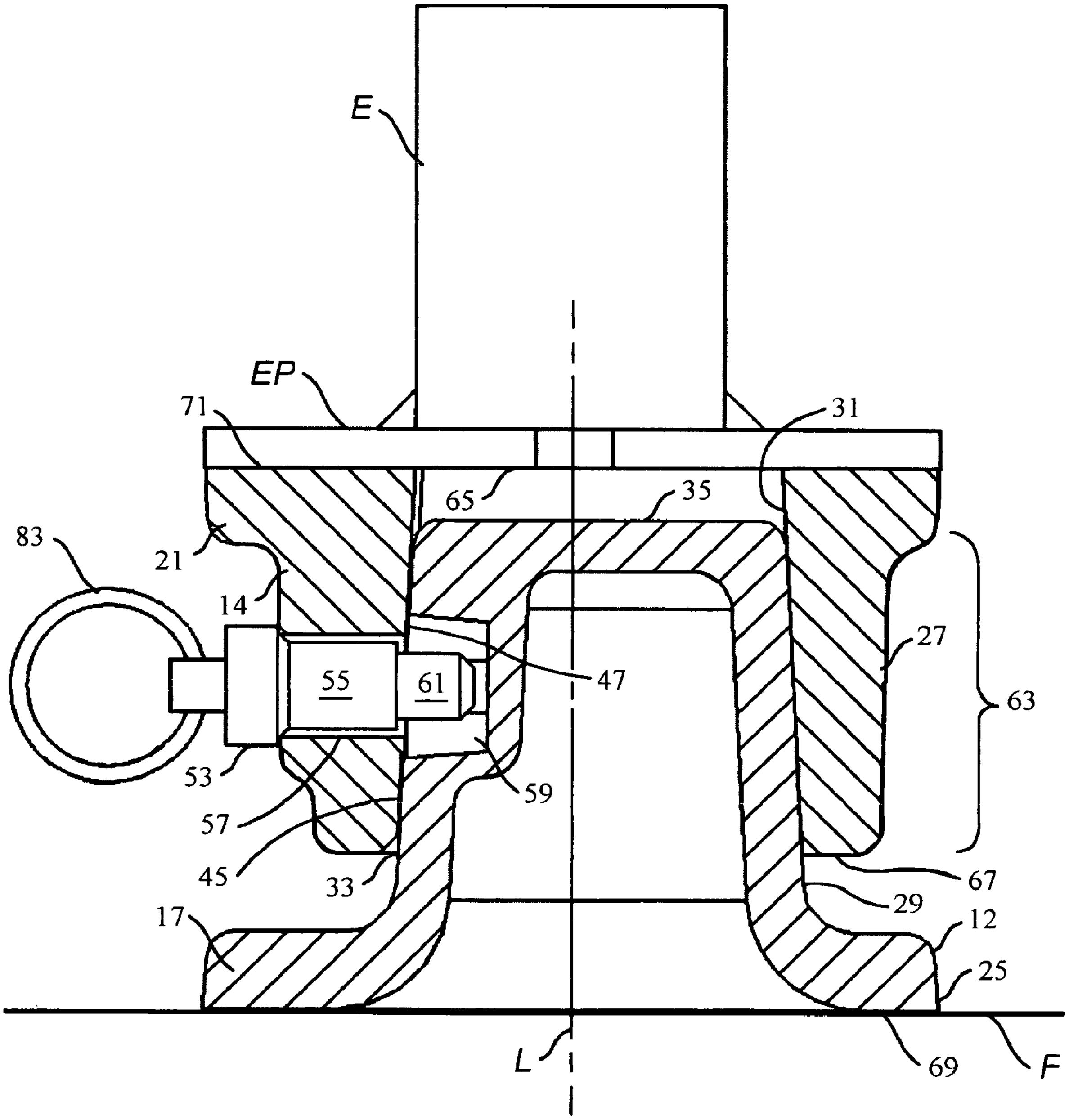
FIG. 2 is a cross-sectional view of the mounting apparatus of the invention being fully assembled including having a releasable locking mechanism provided as a pin through clearance holes between a male bayonet portion of a fitting and a female receiver portion of a base structure.

FIG. 2 is a cross-sectional view of the mounting apparatus 10 of the invention being fully assembled including having the releasable locking mechanism 53 provided as a pin 55 through the clearance holes 57, 59 between the male bayonet 25 and female receiver 27. As illustrated, the respective male bayonet 25 and female receiver 27 are formed with substantially identical conical size and shape within a zone 63 along the common longitudinal axis L which cooperate to prevent the crown 35 of the male bayonet 25 from bottoming against a floor 65 of the female receiver 27. The substantially identical conical size and shape within the zone 63 also prevent a rim portion 67 of the wall 31 around the mouth 33 of the female receiver 27 from bottoming against the mounting plate 17 of the male bayonet 25. Additionally, the cooperating conical shapes of the walls 29, 31 ensures a secure connection between the male bayonet 25 and female receiver 27 that twisting or tilting about the longitudinal axis L is not permitted. Furthermore, the cooperating conical shapes of the walls 29, 31 ensures the interface within the zone 63 having an extensive area such that friction between the conical walls 29, 31 secures the male bayonet 25 and female receiver 27 against rotation relative to one another about the common longitudinal axis L. Accordingly, when present, the rotational alignment mechanism 43 operates primarily as a rotational alignment mechanism for operation during assembly, and after engagement of the base 12 and fitting 14, the rotational alignment mechanism 43 operates as a anti-rotation mechanism to resist relative rotation about the common longitudinal axis L in response to very large twisting forces that are overcome frictional resistance between the conical walls 29, 31.

As further illustrated here, a substantially planar mounting surface 69 of the rigid mounting plate 17 of the base 12 can be connected by fasteners through the one or more mounting holes 19 to an external surface such as a floor board F of an automobile or other vehicle. An external object E such as but not limited to a telescoping pole mount of the type disclosed in co-pending patent application Ser. No. 11/118,734, which is incorporated herein by reference, can be connected to a substantially planar mounting surface 71 of the rigid mounting plate 21 of the rigid fitting 14 by fasteners through the one or more mounting holes 23. For example, the external object E is provided with a mating mounting plate EP structured for connection to the rigid mounting plate 21 of the rigid fitting 14 using the mounting holes 23.

Figure 3:
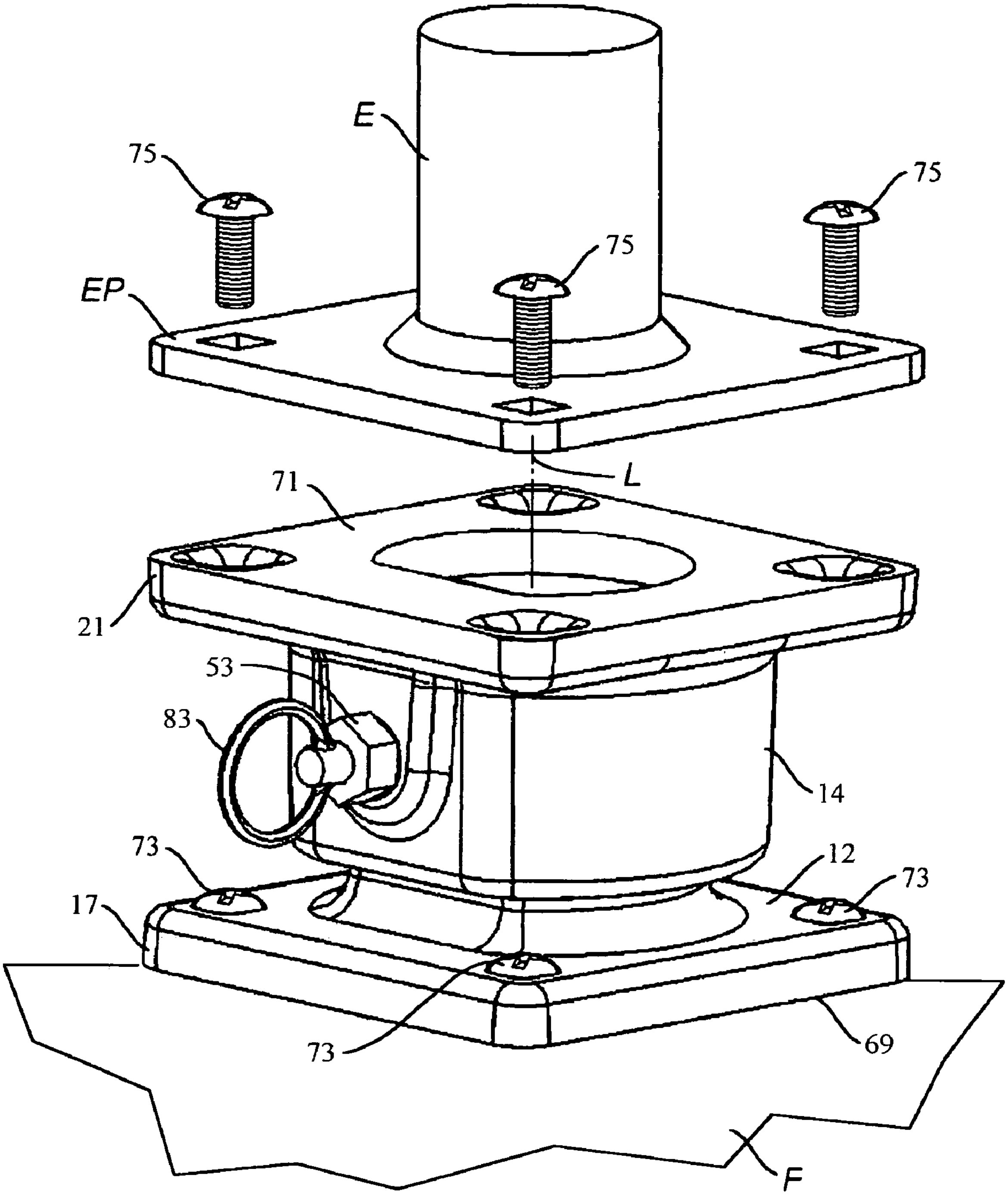
FIG. 3 is a perspective view that illustrates the quick release mounting apparatus of the invention having the fitting assembled with the base structure.

FIG. 3 is a perspective view that illustrates the quick release mounting apparatus 10 of the invention having the fitting 14 assembled with the base structure 12 which is mounted on the external surface F through the mounting surface 69 of the rigid mounting plate 17 by fasteners 73 through the one or more mounting holes 19. Also illustrated installation of the external object E with its mounting plate EP being mated to the rigid mounting plate 21 of the fitting 14 and fasteners 75 being fitted through the corresponding mounting holes 23.

Figure 4:
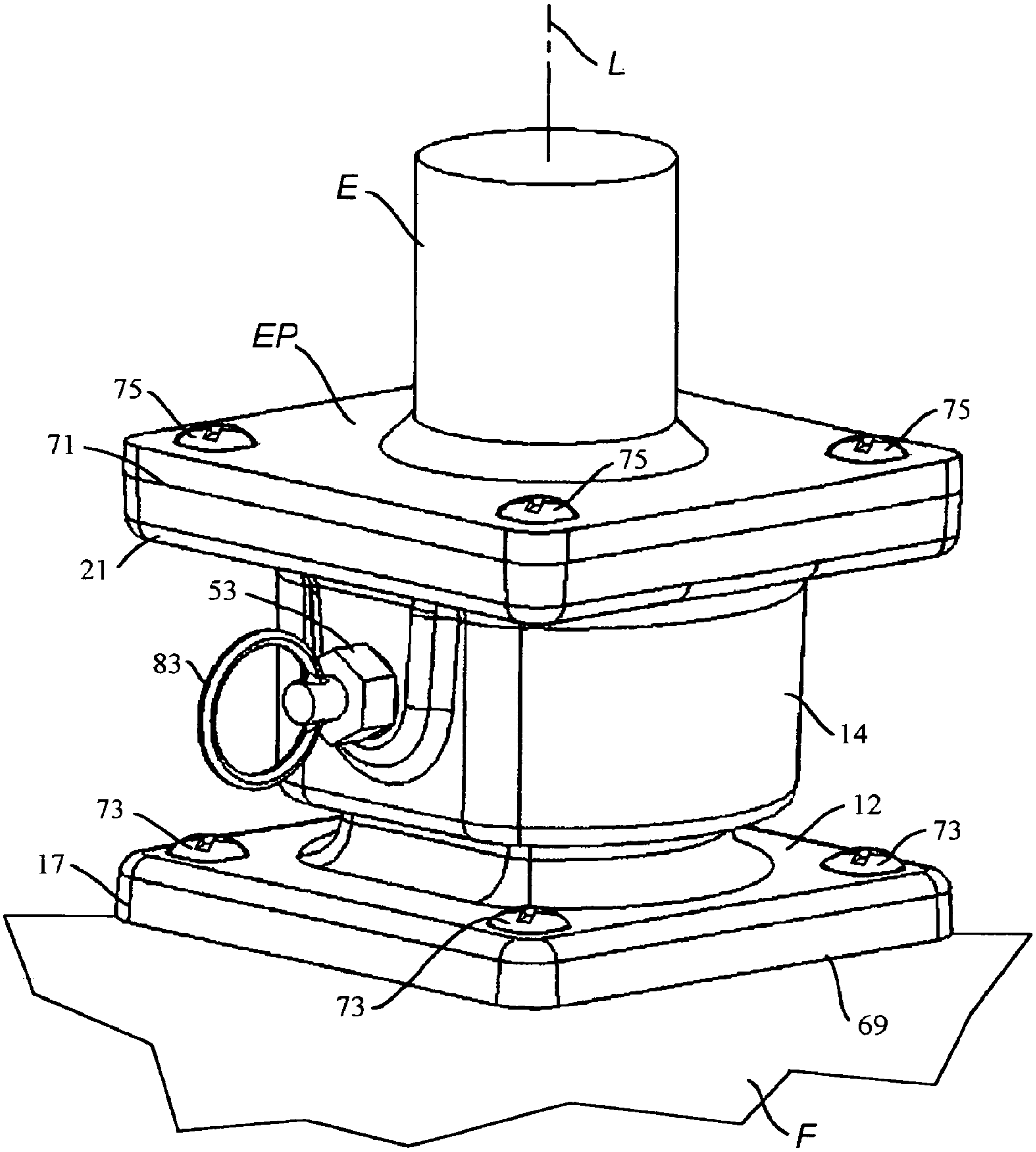
FIG. 4 is a perspective view that illustrates the quick release mounting apparatus of the invention having the fitting assembled with the base structure.

FIG. 4 is a perspective view that illustrates the quick release mounting apparatus 10 of the invention having the fitting 14 assembled with the base structure 12. The base structure 12 is mounted on the external surface F through the mounting surface 69 of its rigid mounting plate 17 by fasteners 73 through the one or more mounting holes 19. Also, the mounting plate EP of the external object E is illustrated as being mated to the rigid mounting plate 21 of the fitting 14 with fasteners 75 through its one or more mounting holes 23.

Thereafter, the external object E can be detached from the external surface F by removal of the optional releasable locking mechanism 53, if present, and decoupling of the fitting 14 from the base 12, or vice versa if their roles are reversed.

Figure 5:
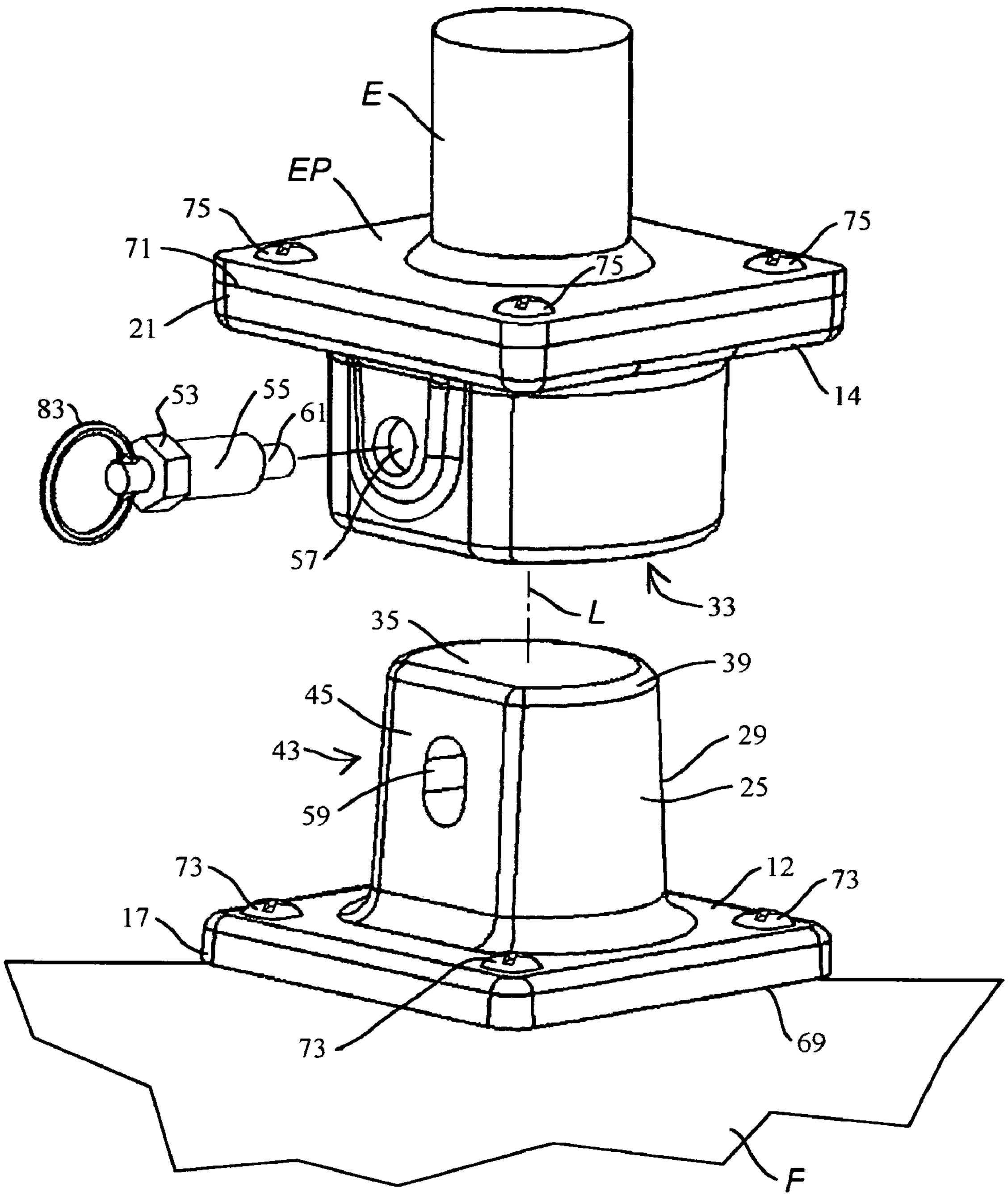
FIG. 5 is another perspective view of the quick release mounting apparatus of the invention that illustrates detachment of an external object from an external surface by removal of an optional releasable locking mechanism, if present, and decoupling of the fitting from the base structure, or vice versa if their roles are reversed.

FIG. 5 is another perspective view that illustrates detachment of the external object E from the external surface F by removal of the optional releasable locking mechanism 53, if present, and decoupling of the fitting 14 from the base 12, or vice versa if their roles are reversed. Reattachment is accomplished in reverse order.

Figure 6:
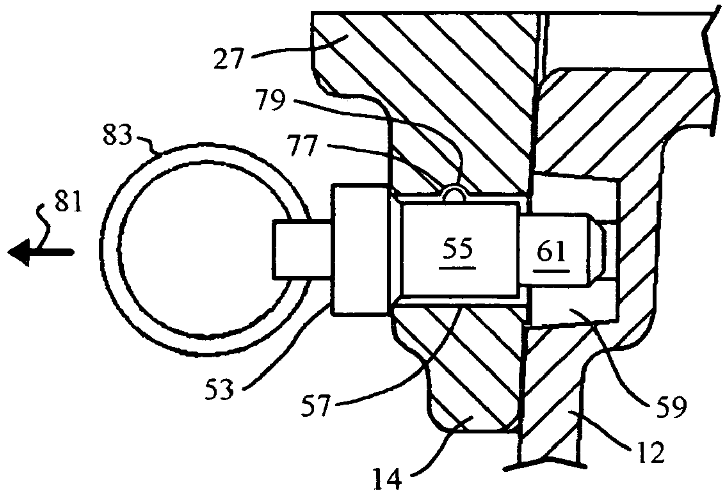
FIG. 6 is a partial cross-sectional view of the quick release mounting apparatus of the invention that illustrates one releasable retaining mechanism of the invention for releasably retaining the optional locking mechanism relative to the male bayonet portion of the fitting and the female receiver portion of the base structure.

FIG. 6 is a partial cross-sectional view that illustrates one releasable retaining mechanism 77 for releasably retaining the locking mechanism 53 relative to the male bayonet 25 and female receiver 27. By example and without limitation the releasable retaining mechanism 77 is a detent 79 that can be released by force 81 applied along the body of the pin 55 and directed away from the base 12 and fitting 14, for example, by pulling on a ring 83 attached to the pin 55. The locking mechanism 53 is operated by forcing the pin 55 in the direction opposite from the force 81.

Figure 7:
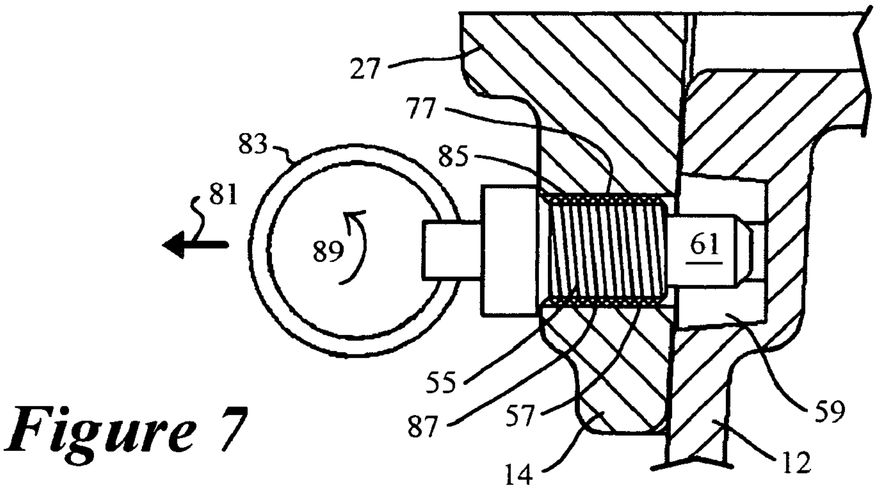
FIG. 7 is another partial cross-sectional view of the quick release mounting apparatus of the invention that illustrates a different embodiment of the releasable retaining mechanism of the invention for releasably retaining the optional locking mechanism relative to the male bayonet portion of the fitting and the female receiver portion of the base structure.

FIG. 7 is another partial cross-sectional view that illustrates a different embodiment of the releasable retaining mechanism 77 for releasably retaining the locking mechanism 53 relative to the male bayonet 25 and female receiver 27. By example and without limitation the releasable retaining mechanism 77 is a male thread 85 formed on the pin 55 that is matched to a mating female thread 87 formed in the clearance hole 57 through the side wall 31 of the female receiver 27. Alternatively, the clearance hole 57 through the side wall 31 of the female receiver 27 is oversized, and the clearance hole 59 through the side wall 29 of the male bayonet 25 is sized to match the nose 61 of the pin 55. According to this alternative embodiment, which is also contemplated and can be substituted without deviating from the scope and intent of the present invention, the male thread 85 is formed on the nose 61 of the pin 55 and the mating female thread 87 is formed in the clearance hole 59. In either embodiment, the locking mechanism 53 is released by the force 81 applied along the body of the pin 55 and directed away from the base 12 and fitting 14, for example, by turning the ring 83 as indicated by the arrow 89, for example, left or counterclockwise. The locking mechanism 53 is engaged by turning the pin 55 in the opposite direction, for example, right or clockwise.

Figure 8:
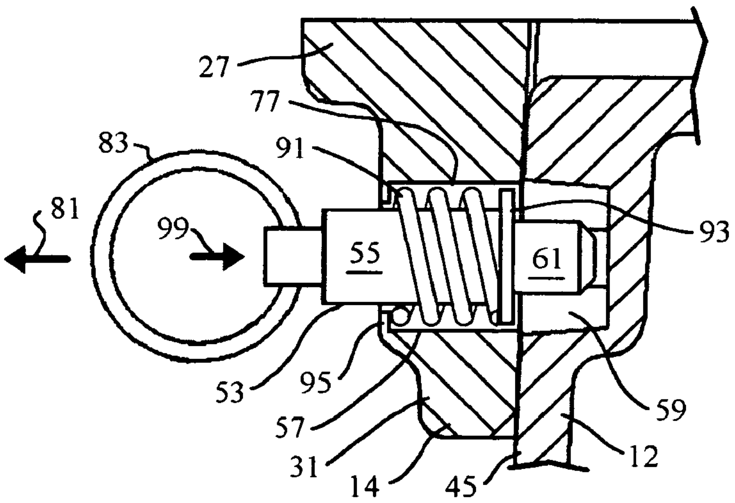
FIG. 8 is another partial cross-sectional view of the quick release mounting apparatus of the invention that illustrates another different embodiment of the optional releasable retaining mechanism of the invention for releasably retaining the locking mechanism relative to male bayonet portion of the fitting and the female receiver portion of the base structure.

FIG. 8 is another partial cross-sectional view that illustrates another different embodiment of the releasable retaining mechanism 77 for releasably retaining the locking mechanism 53 relative to the male bayonet 25 and female receiver 27. By example and without limitation the releasable retaining mechanism 77 is a resiliently compressible member 91, for example a compression spring, positioned within the clearance hole 57 and captured between a plate 93 positioned adjacent to a far end of the pin 55 near the nose 61 and an interior lip 95 positioned adjacent to an exterior surface 97 of the side wall 31 of the female receiver 27. The nose 61 of the pin 55 portion of the locking mechanism 53 is inserted into the clearance hole 59 in the flat face 45 of the male bayonet 25 by the spring or other resiliently compressible member 91 forcing the plate 93 in the direction 99.

By example and without limitation the releasable retaining mechanism 77 can be released by applying the force 81 along the body of the pin 55 directed away from the base 12 and fitting 14, for example, by pulling on the ring 83 attached to the pin 55.

Figure 9:
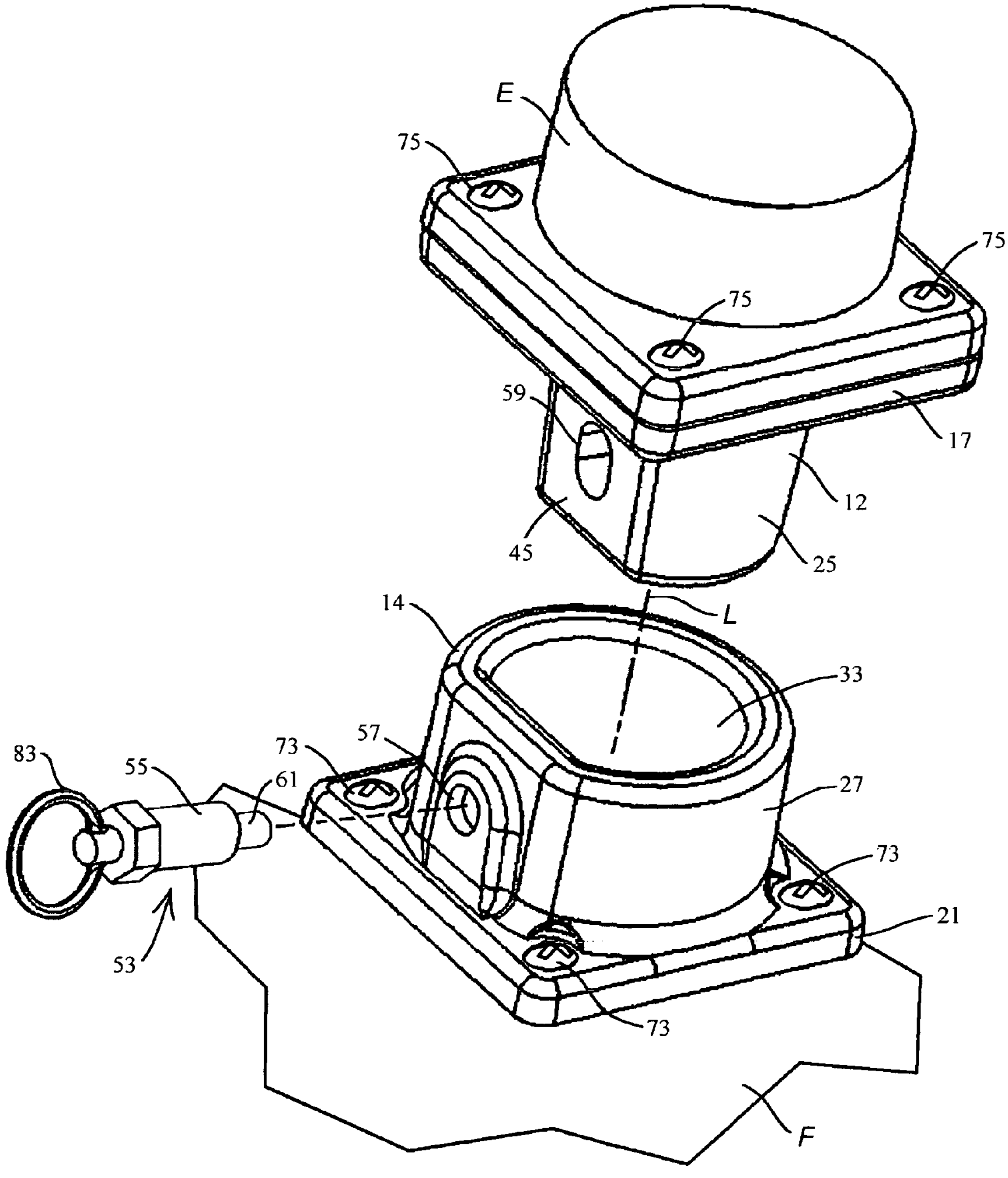
FIG. 9 illustrates the quick release mounting apparatus of the invention having the respective roles of the base and fitting being reversed such that the fitting is connected through its mounting plate to the external surface, and the base structure is connected through its mounting plate to the external object that is to be removably mounted to the external surface.

FIG. 9 illustrates the device 10 of the invention having the respective roles of the base 12 and fitting 14 being reversed such that the fitting 14 is connected through its mounting plate 21 to the external surface F, and the base 12 is connected through its mounting plate 17 to the external object E that is to be removably mounted to the external surface F.

While the preferred embodiment of the invention has been illustrated and described, it will be appreciated that various changes can be made therein without departing from the spirit and scope of the invention. For example, Therefore, the inventor makes the following claims.

What is claimed is:

1. A quick release mounting apparatus, comprising:

a detachable base having a mounting plate comprising a base mounting surface, the base mounting surface being adapted to be provided with means for attaching the base mounting surface to a surface external of the base;

a detachable fitting having a mounting plate comprising a fitting mounting surface, the fitting mounting surface being adapted to be provided with means for attaching the fitting mounting surface to a surface external of the fitting;

a connector coupled between the base and the fitting opposite from the base and fitting mounting surfaces, the connector being formed of a male bayonet inserted into a mating female receiver, each of the male bayonet and female receiver having substantially conical forms truncated to substantially similar lengths structured for mating along a common longitudinal axis with an automatic self-regulating rotational alignment mechanism therebetween comprising mating surfaces formed integrally of the respective male bayonet and a mating female receiver and operable along the common longitudinal axis, with the substantially conical form of the female receiver being extended deeper than a mating portion of the substantially conical form of the male bayonet for frictional securement between the male and female members; and a releasable secondary locking mechanism operable between the male bayonet and female receiver substantially transverse of the common longitudinal axis comprising a slot that is elongated along the common longitudinal axis, the releasable locking mechanism comprising:

a blind recess formed in the male bayonet substantially transverse of the common longitudinal axis, a clearance aperture formed through the female receiver substantially transverse of the common longitudinal axis and substantially aligned with the blind recess, and a pin comprising a first portion thereof sized larger than the clearance aperture, a second portion thereof substantially aligned with the first portion and sized to pass through the clearance aperture, and a third portion sized to pass through the clearance aperture and into the blind recess.

2. The apparatus of claim 1 wherein the common longitudinal axis is substantially perpendicular to the respective base and fitting mounting plates.

3. The apparatus of claim 2 wherein the respective base and fitting mounting plates each further comprises one or more apertures formed therethrough and being sized to receive the respective means for attaching the respective base and fitting mounting surfaces to the respective surfaces external of the respective base and fitting.

4. The apparatus of claim 3 wherein the rotational alignment mechanism further comprises mating flats formed on the male bayonet and female receiver along the common longitudinal axis.

5. The apparatus of claim 4 wherein the male bayonet and female receiver each further comprise substantially smooth and continuous mating surfaces along the common longitudinal axis.

6. The apparatus of claim 5 wherein the first portion of the pin further comprises a first width, the second portion thereof further comprises a second width different from the first width, and the third portion thereof further comprises a third width different from the first width and the second width.

7. The apparatus of claim 6 wherein the second width of second portion of the pin further comprises a width that is smaller the first width, and the third width of third portion of the pin further comprises a width that is smaller the second width.

8. The apparatus of claim 7 wherein the releasable locking mechanism further comprises means for releasably retaining the pin.

9. A quick release mounting apparatus, comprising:

a base having a mounting plate comprising means for securing to a first external surface;

a fitting having a mounting plate comprising means for securing to a second external surface spaced away from the first external surface;

a connector coupled between the base and the fitting, the connector comprising a male bayonet and a mating female receiver, each of the male bayonet and female receiver having substantially inverse conical bodies structured for nesting along a common longitudinal axis providing frictional securement between the male and female members, a mating portion of the male bayonet body being truncated relative to the female receiver;

a rotational alignment mechanism formed integrally of each of the male bayonet and female receiver and being automatically operable therebetween along the common longitudinal axis comprising a slot that is elongated along the common longitudinal axis; and a releasable secondary locking mechanism operable between the male bayonet and female receiver substantially transversely of the common longitudinal axis, the releasable locking mechanism comprising:

a blind recess formed in the male bayonet substantially transverse of the common longitudinal axis, a clearance aperture formed through the female receiver substantially transverse of the common longitudinal axis and substantially aligned with the blind recess, and a pin comprising a first head portion thereof being sized larger than the clearance aperture, a second body portion thereof being sized to be received through the clearance aperture, and a third nose portion thereof substantially aligned with the first portion and sized to be slidably received through the clearance aperture and slidably received into the blind recess.

10. The apparatus of claim 9 wherein the rotational alignment mechanism further comprises a pair of substantially planar surfaces formed on the respective conical bodies of the male bayonet and female receiver, the planar surfaces being matingly inclined relative to the common longitudinal axis.

11. The apparatus of claim 10 wherein the releasable locking mechanism is further operable through the substantially planar surfaces of the rotational alignment mechanism.

12. The apparatus of claim 11 wherein the blind recess of the releasable locking mechanism further comprises a blind recess formed in a first of the substantially planar surfaces formed on the conical body of the male bayonet, and the clearance aperture further comprises a clearance aperture formed through a second of the substantially planar surfaces formed on the conical body of the female receiver.

13. The apparatus of claim 12 wherein: the clearance aperture of the releasable locking mechanism formed in the female receiver further comprises a substantially cylindrical aperture;

the blind recess of the releasable locking mechanism formed in the male bayonet further comprises a slot aperture substantially aligned along the common longitudinal axis and having a width transverse of the common longitudinal axis that is narrower than a diameter of the clearance aperture formed in the female receiver; and the nose portion of the pin is further sized smaller than the body portion.

14. The apparatus of claim 13 wherein the releasable locking mechanism further comprises a releasable retaining mechanism between the pin and one of the male bayonet and the female retainer and being structured for releasably retaining the pin relative to the one of the clearance apertures.

15. The apparatus of claim 14 wherein the releasable retaining mechanism further comprises a releasable retaining mechanism selected from the group of releasable retaining mechanisms composed of: a threaded retaining mechanism, a spring retaining mechanism, and a detent retaining mechanism.

16. The apparatus of claim 15 wherein the male bayonet and female receiver comprise cooperating truncated conical shapes having respective exterior and interior side walls each inclined at substantially inverse angles to the common longitudinal axis, and the male bayonet further comprises a semi-conical blind recess formed therein substantially aligned with the common longitudinal axis and communicating with the mounting plate.

17. A quick release mounting apparatus, comprising:

a detachable base receiver having a substantially rigid hollow conical body formed along a first longitudinal axis and truncated in a crown portion, and having at a base thereof a substantially rigid mounting flange comprising a substantially rigid plate surrounding the base of the truncated body and being formed with a plurality of fastener clearance apertures spaced around the base of the truncated body and a substantially planar attachment surface opposite from the truncated conical body;

a detachable tubular fitting having a substantially rigid cup-shaped body formed with a conical interior cavity formed along a second longitudinal axis and truncated by a floor thereof, the conical interior cavity being an inverse of the truncated conical body of the base receiver and being sized to receive the truncated conical body of the base receiver thereinto in a nested manner providing frictional securement between the male and female members with the first and second longitudinal axes substantially coinciding and with the crown portion of the truncated conical body of the base receiver being spaced away from the floor of the conical interior cavity of the cup-shaped body and the mounting flange of the base receiver being spaced away from a mouth portion of the conical interior cavity of the cup-shaped body opposite from the floor portion thereof, and a substantially rigid mounting flange substantially surrounding a base of the cup-shaped body opposite from the mouth portion thereof and being formed with a plurality of fastener clearance apertures spaced around the base of the cup-shaped body and a substantially planar attachment surface opposite from the cup-shaped body;

each of the truncated conical body of the base receiver and the conical interior cavity of the cup-shaped body portion of the fitting being formed with cooperating integral automatic rotational alignment features operable along the respective first and second longitudinal axes thereof; and a releasable secondary locking mechanism operable between the truncated conical body of the base receiver and the cup-shaped body portion of the fitting, the releasable locking mechanism further comprising:

a blind clearance slot formed in an exterior surface of the hollow conical body substantially perpendicular to the first longitudinal axis and being extended therealong, a substantially cylindrical clearance aperture formed through the cup-shaped body of the fitting substantially perpendicular to the second longitudinal axis and having a substantially constant diameter being larger than a width of the blind clearance slot transverse of the first longitudinal axis, and a pin having a first head portion thereof sized larger than the clearance aperture, a second substantially cylindrical portion sized to slidingly pass through the clearance hole and sized larger than a transverse width of the blind clearance slot, and a third nose portion sized to slidingly pass through the clearance aperture and slidingly enter into the blind clearance slot.

18. The apparatus of claim 17 wherein the cooperating rotational alignment features further comprise:

a first flat formed on the truncated conical body of the base receiver and being inclined at a first angle toward the first longitudinal axis between the base and the crown portions thereof, and a second flat formed on an interior wall of the conical interior cavity of the cup-shaped body of the fitting and being inclined toward the second longitudinal axis between the floor and the mouth portions thereof at a second angle that is the inverse of the first angle.

19. The apparatus of claim 18 wherein the blind clearance slot of the releasable locking mechanism further comprises a clearance slot formed in the first flat formed on the truncated conical body of the base receiver the substantially cylindrical clearance aperture formed through the cup-shaped body of the fitting further comprises an aperture communicating between an exterior surface of the body and the second flat formed on the interior wall of the conical interior cavity thereof; and further comprising a releasable retaining mechanism operable between the pin and one of the body of the fitting and body of the base for releasably retaining the pin relative thereto, the releasable retaining mechanism further comprising a releasable retaining mechanism selected from the group of releasable retaining mechanisms composed of: a threaded retaining mechanism, a spring retaining mechanism, and a detent retaining mechanism.

* * * * *